United States Patent
Jurisch

(10) Patent No.: US 6,873,077 B2
(45) Date of Patent: Mar. 29, 2005

(54) SHELL-SHAPED MAGNET

(75) Inventor: Frank Jurisch, Hanau (DE)

(73) Assignee: Vacuumschmelze GmbH & Co. KG (DE)

(*) Notice: Subject to any disclaimer, the term of this patent is extended or adjusted under 35 U.S.C. 154(b) by 0 days.

(21) Appl. No.: 10/381,443

(22) PCT Filed: Sep. 23, 2002

(86) PCT No.: PCT/EP02/10656
§ 371 (c)(1),
(2), (4) Date: Jul. 22, 2003

(87) PCT Pub. No.: WO03/034572
PCT Pub. Date: Apr. 24, 2003

(65) Prior Publication Data
US 2004/0028945 A1 Feb. 12, 2004

(30) Foreign Application Priority Data
Sep. 26, 2001 (DE) .......... 101 47 310

(51) Int. Cl.⁷ .............................. H02K 21/12
(52) U.S. Cl. .............. 310/156.01; 310/216; 310/254; 310/156.21; 310/181; 310/258; 310/259
(58) Field of Search .................. 310/156.1, 154.17, 310/218, 254, 258, 259, 181, 83, 89, 91, 114, 156, 216, 49, 78, 239

(56) References Cited

U.S. PATENT DOCUMENTS

| | | | | |
|---|---|---|---|---|
| 4,885,489 A | * | 12/1989 | Stuhr | 310/78 |
| 4,978,876 A | * | 12/1990 | Koster | 310/239 |
| 5,874,794 A | * | 2/1999 | Trammell et al. | 310/154.17 |
| 5,920,139 A | * | 7/1999 | Fujiwara et al. | 310/154.11 |
| 6,512,318 B2 | * | 1/2003 | Torok et al. | 310/181 |
| 6,713,921 B2 | * | 3/2004 | Sebastian et al. | 310/156.38 |
| 6,741,002 B2 | * | 5/2004 | Nishiyama et al. | 310/156.53 |

FOREIGN PATENT DOCUMENTS

| | | |
|---|---|---|
| DE | 19633209 | 3/1997 |
| DE | 19849224 | 5/2000 |
| WO | WO 93/22778 | 11/1993 |

OTHER PUBLICATIONS

Japanese Patent Abstract 04261352, vol. 17, No. 47, Jan. 28, 1993.

Japanese Patent Abstract 04021331, vol. 16, No. 178, Apr. 28, 1992.

Japanese Patent Abstract 06231941, vol. 28, No. 599, Nov. 15, 1994.

* cited by examiner

Primary Examiner—Chau N. Nguyen
Assistant Examiner—Nguyen T. Ha
(74) Attorney, Agent, or Firm—Dean W. Russell; Kilpatrick Stockton LLP

(57) ABSTRACT

Cup-shaped magnet for electric motors having two face surfaces, two lateral surface, and two top surfaces, which are curving between the face surfaces along the lateral surfaces, whereby the lateral faces are chamfered in a v-shape.

8 Claims, 6 Drawing Sheets

Preferred direction parallel anisotropic as drawn.

Section A'–A'

Section B'–B'

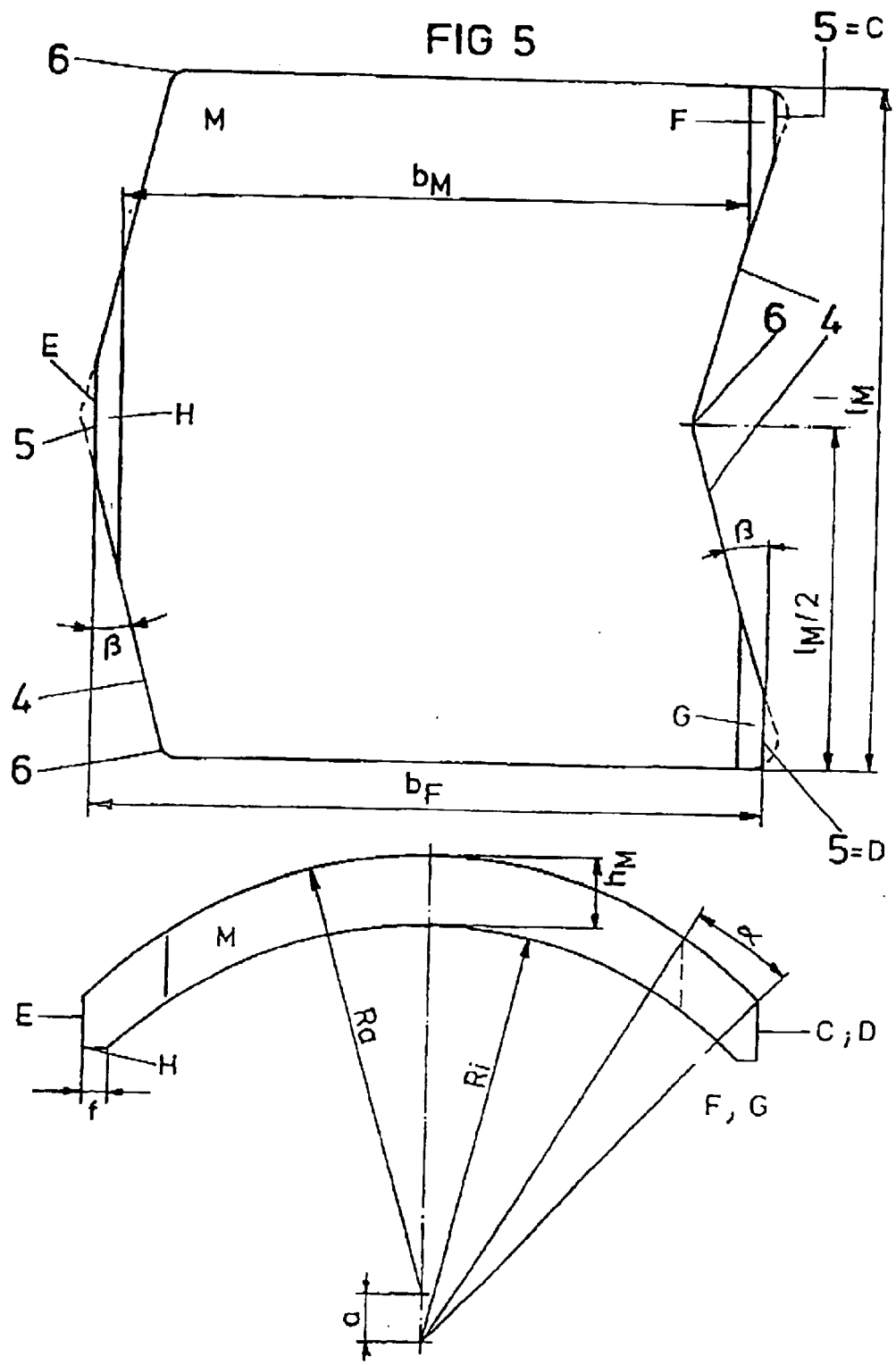

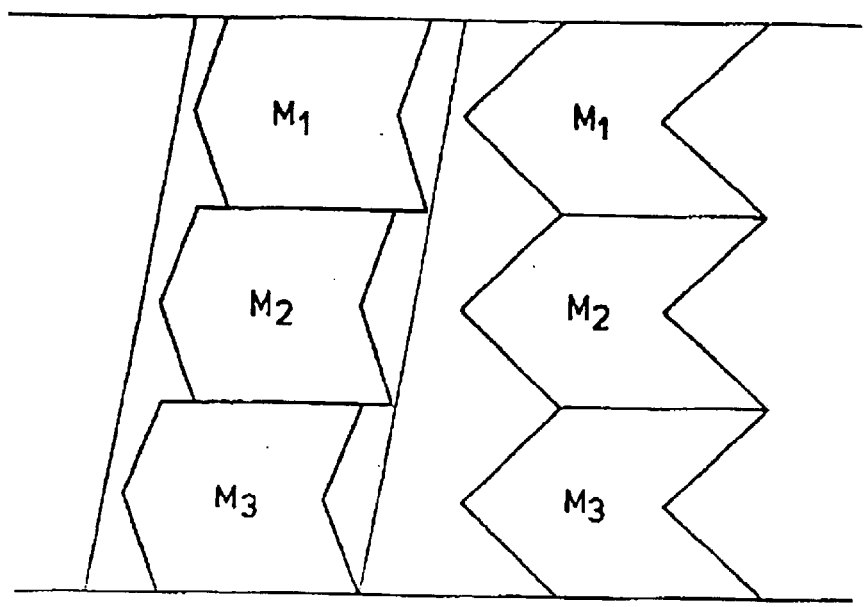
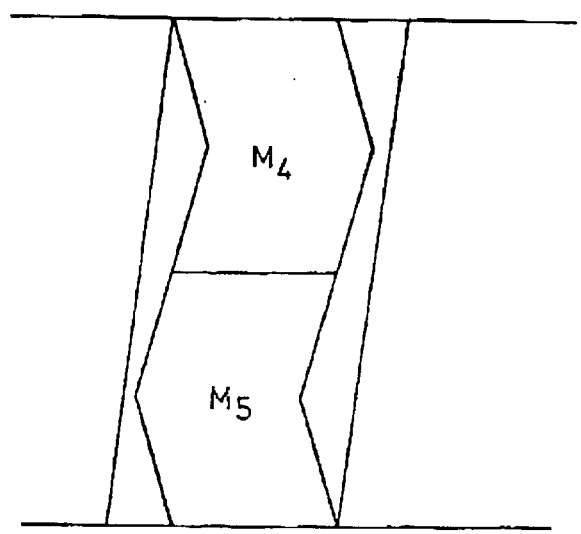

SHELL-SHAPED MAGNET

This application claims priority to German Application No. 101 47 310.9 filed on Sep. 26, 2001 and is the United States national phase of International Application No. PCT/EP02/10656 filed on Sep. 23, 2002, the entire contents of which are incorporated herein by reference.

FIELD OF THE INVENTION

The invention relates to a cup-shaped magnet for electric motors having two face surfaces, two lateral surfaces and two curving top surfaces between the face surfaces along the lateral surfaces.

BACKGROUND OF THE INVENTION

Due to an interaction between the guy anchor (slots) and the exciter (pole formation) undesirable harmonics are frequently created in electrical motors, which appear as a slot detent torque (reluctance moment) and harmonics, which are caused by the exciter field in the induced tension. The problem with reluctance moments has been described for instance in the pre-published German patent application DE 196 33 209 A1.

An effective method for suppressing these harmonics generally consists in canting the stator and/or rotor by a certain slot dispartment or by a certain amount thereof. The angle of this cant, which is running in the direction of the circumference, will be designated as $\alpha$. However, the automatic winding of the slotted guy anchor (winding bearing part) for instance by means of winding-up technology or a winding arm through chamfered slots is only possible in permanent magnetically excited rotating electric machines with difficulty, or it is even impossible. This is why the cant must occur in the exciter part, that is, in the permanent magnet.

The axial helix angle $\beta$, which is converted to the length, results from radial cant $\alpha$, rotor radius R, which is $R_a$ in concentric cups or $R_i + h_M$ in non-concentric radii, and results with respect to:

$$\beta = \arctan(2R/1M^* \sin(\alpha/2)) \quad (1)$$

Sintered permanent magnets require mechanic reworking by means of grinding due to the attrition, which is full of tolerances, in the production process. The cups are ground in a highly productive through-feed method without a separate holding and clamp mechanism, where the lateral edges and appropriate pressure and transport devices only guide them.

Cups are parts of at least one, but frequently two curved surfaces 7, 8, which run parallel to the magnet's end face in an axial direction. For instance, a cup with curved surface 7 is depicted in the drawing in figure no. 1. An embodiment with two curved surfaces 8 is shown in figure no. 2. The curved surfaces 7, 8 are running perpendicular to the magnet's additional end faces, which have been designated as face surfaces 1, in an axial direction. Lateral faces 2 in straight cups—as depicted in figure no. 2— are running parallel to the axial grinding direction. Lateral sides 3 can no longer act as a guiding edge in chamfered cups—as shown in figure no. 3, as they are running in an angle $\beta$ (axial cant) from a few degrees to several 10 degrees according to helix angle $\alpha$ and magnet length $1_M$ in the axial grinding direction. Grinding these chamfered cups (figure no. 3) will then only be possible in clamping devices, which must be produced separately, for each magnet geometry, and in passes, which are separate for the inner and outside radius ($R_i$ and $R_a$). Grinding the magnet's width $b_M$ and the magnet's length $1_M$ would require additional stages and devices.

The expenditure with respect to time and devices including the manual assembly during the grinding process significantly increases the costs for chamfered cups when compared to the through-feed grinding of the complete cross-sectional profile (base form, width, inner radius and outside radius including the magnet's thickness $h_M$) of a non-chamfered magnet.

In addition, difficulties and problems occur when powder compression molding with these cups, which are wound within themselves, as for instance when removing them from the mold (pushing off the magnets from the mold), transporting and stacking them in the sinter boxes, since the cup-shaped magnets bear against each other only at two points. These points are identified in figure no. 3 by means of the reference symbol A and B.

The lateral faces 2 and bases 3 having a basis width f, and which serve as longitudinal parallel guide faces, are indispensable for grinding. For the pressing process, lateral faces 2 or 3 must run parallel to the magnet's height at least to a certain extent as well. In order to avoid the above-described production problems, solutions for reducing the detent torques through bypassing a set cup, which are based on straight non-chamfered cups, are known from prior art, as for instance the pre-published German patent application DE 196 33 209 A1, which had been mentioned in the beginning. However, these solutions are not able to suppress the detent torques as completely as a cant. It is true that certain saw tooth arrangements at an axial magnetic longitudinal scaling or uneven pole dispartments reduce the slot detent torques, but the arrangements are reacting in a very sensitive manner to geometric tolerances, and the risk of circular currents exists when the windings are switched in a parallel manner in case of an unintegrated exciter pole dispartment.

SUMMARY OF THE INVENTION

The invention's task thus consists in specifying a cup-shaped magnet for deployment in electric motors, which on the one hand offers a suppression of reluctance moments in electric motors to a large extent, and on the other hand requires only minimal production costs.

It was customary so far to evenly project the required radial cant (e.g. by one slot dispartment) in an axial helix angle of the magnet's lateral edges across the magnet's entire length. A cup, in other words, a body having curved top surfaces and bases is thus created, which has the form of a parallelogram when viewed from above, and which is wound in itself. A circular ring section having parallel, diametrically directed lateral edges, whereby both front faces are twisted by the helix angle, can be seen from the lateral front face. A stable rest and an axial guidance cannot be obtained with both corners alone, which are furthest apart from each other.

It has been provided according to the invention to project the cant for instance to half its length and to let it run back again to the second front face. When viewed from above this would created a v-shaped magnet, which has three stable rest points at the same height. The pressing of this cup is simpler and above all, it can be loosely ground while it is passing. This creates a considerable cost advantage as compared to the current production method and manufacturing sequences.

Furthermore, a complete cant can preferably be obtained in approximately the middle of the axial length. This center must be understood as an area, which extends itself from the center point by approx. 10% in both directions.

It is preferred for the front faces to be congruently situated in the axial direction. This type of v-shaped cant will avoid axial forces, which would strain the bearing. This causes problems particularly in larger machines when using conventional cants. The axial forces are compensating themselves completely by means of the cant flanks, which are running symmetrically in both directions of the circumference.

Oxide compounds of rare earth elements or hard ferrites or AlNiCo materials are used above all as magnet material. Furthermore, it is preferred for the magnet to be produced by a sintering process.

Finally, a continued development of the invention provides for an axial differentiation of several partial magnets, whereby the helix angle of the partial magnets consists of only the $n^{th}$ part of the total cant, and the partial magnets are arranged in a row and are tangentially offset for an amount n of partial magnets.

BRIEF DESCRIPTION OF THE DRAWINGS

The invention will be explained in more detail by means of the figures in the drawings, whereby the same elements are designated with the same reference symbols. The following is shown:

FIG. 5: a second embodiment of a magnet in accordance with the invention, FIGS. 6a & 6b: a third embodiment of a magnet in accordance with the invention having an n-fold axial differentiation, and FIG. 7: a fourth embodiment of a magnet in accordance with the invention having a two-fold differentiation.

DETAILED DESCRIPTION

When grinding chamfered cup-shaped magnets a considerable problem consists in the absence of a stable lateral guide and a stable support in the through-feed process. A three-point support for a magnet M in accordance with the invention provides sufficient support in a parallel guide-rail. This support improves the more both points C and D in FIGS. 4 and 5, which are located on one side, are arranged as distant from each other as possible, and if point E is located approximately at a center point between both these points. Complete guidance is neither necessary nor required. The same applies for a plan support by means of bases F, G and H as depicted in FIGS. 4 and 5.

Figure 1:
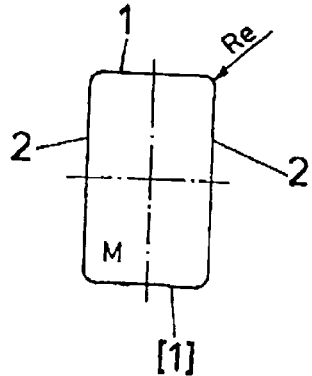
FIG. 1: the formation of a known cup-shaped magnet for use in electric motors having a unilateral curve.
Figure 1:
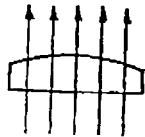
Figure 1:
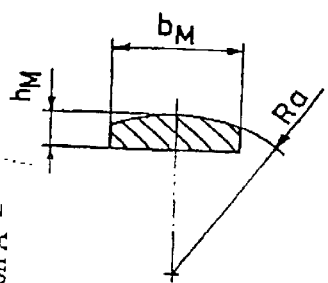
Figure 1:
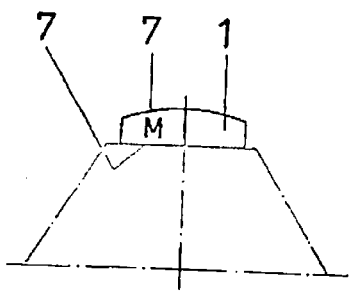
Figure 1:
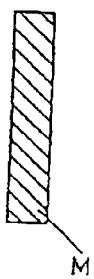
Figure 1:
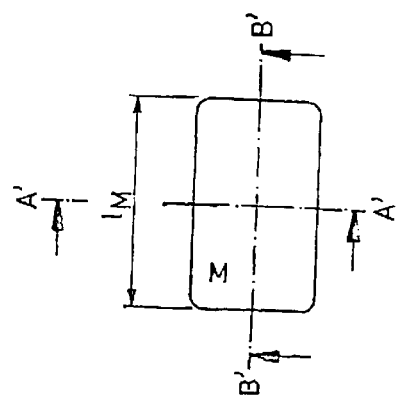
Figure 2:
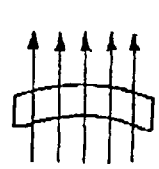
FIG. 2: a known cup-shaped magnet having a bilateral curve.
Figure 2:
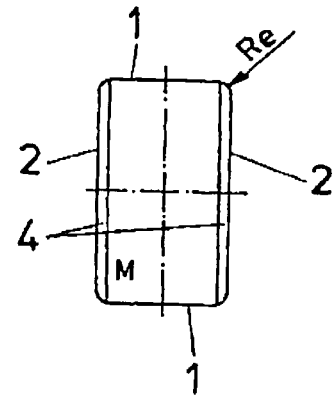
Figure 2:
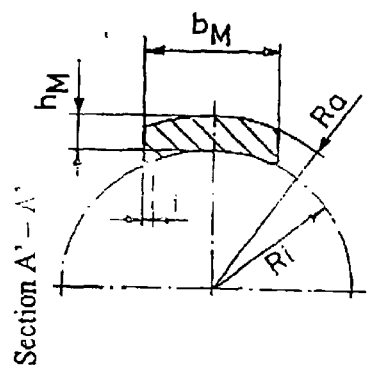
Figure 2:
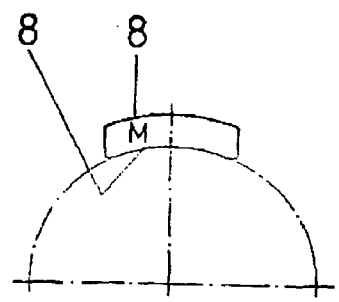
Figure 2:
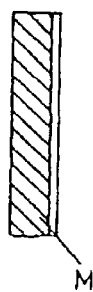
Figure 2:
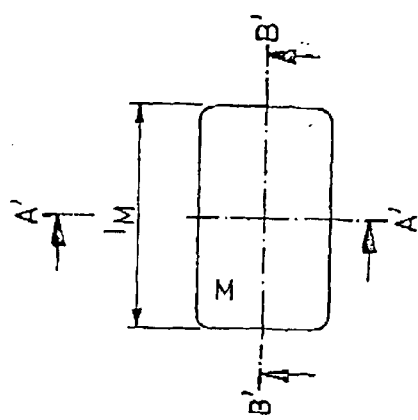
Figure 3:
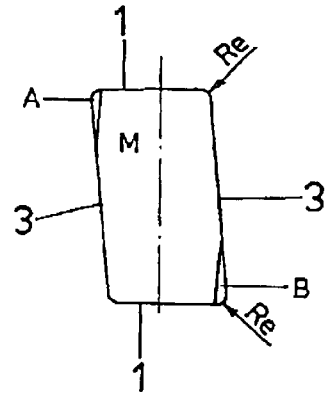
FIG. 3: a cup-shaped magnet having chamfered edges.
Figure 3:
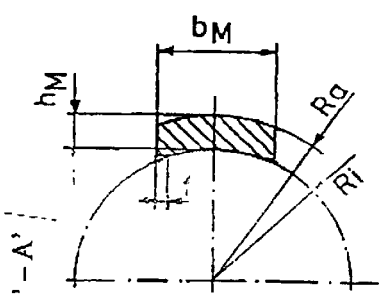
Figure 3:
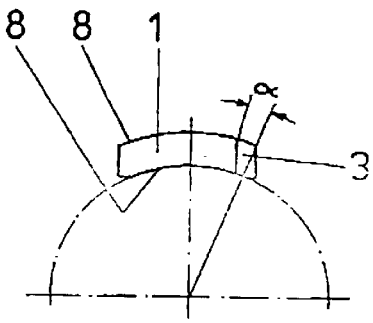
Figure 3:
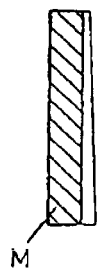
Figure 3:
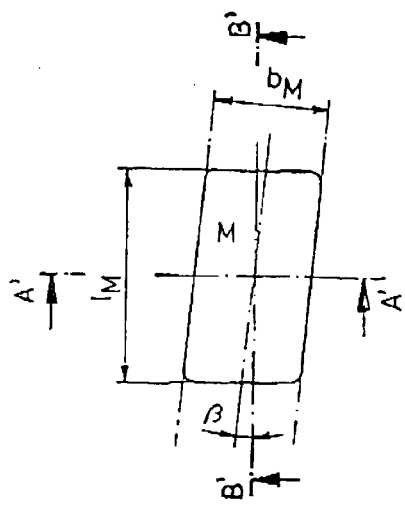
Figure 4:
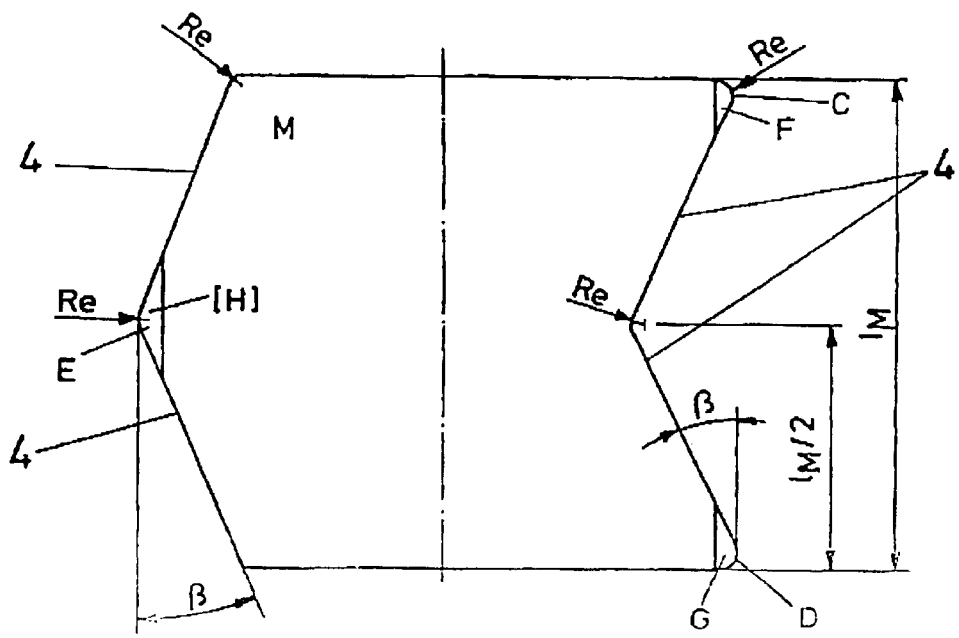
FIG. 4: an initial embodiment of a cup-shaped magnet in accordance with the invention.
Figure 4:
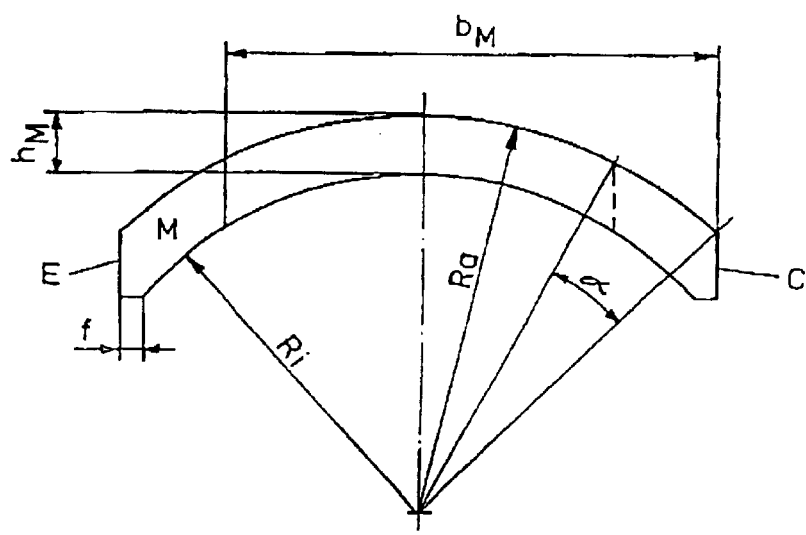

Now, magnet M was created in such manner compliant with FIGS. 4 and 5 in accordance with the invention that required cant β will not run continuously between front faces 1, but that the magnet shows v-shaped, 90° offset lateral faces 4, which are running parallel to each other in sections. Magnet M thus obtains its full magnetic cant already after approximately half the length, and then runs back to its original state. A certain straight flanged transition region 5 or arc-shaped transition region 6 having a radius $R_e$ at docking sites C, D and E is allowed, and can be taken into consideration when calculating the helix angle. However, this is not mandatory.

The following results from the equation (1) while taking into consideration half the length:

$$\beta=\arctan(4R/1_M \cdot \sin(\alpha/2n)) \qquad (2)$$

The entire required cant can occur in a magnet, or only the $n^{th}$ part of this cant as depicted in figure no. 6, when axially staggering several magnets per machine length n-fold. Complete total helix angle β is created by means of a tangentially offset axial stringing together of several magnets $M_1$, $M_2$, and $M_3$ as shown in figure no. 6a. In comparison with it, figure no. 6b shows an arrangement of magnets $M_1$, $M_2$, and $M_3$ without a subdivision.

The magnets' cant ($M_4$, $M_5$) by half of the total helix angle suffices in case of a two-fold (or even multiple even-numbered) differentiation, and magnets $M_4$, $M_5$ will be placed together in an alternating manner as depicted in FIG. 7, whereby the front faces are merging without being offset. The following results from equation (2) in case of n subdivisions of the length:

$$\beta=\arctan(4R/1_M \cdot \sin(\alpha/2n)) \qquad (3)$$

Oxide compounds of rare earth elements or hard ferrites or AlNiCo materials are used in connection with a sintering process in the embodiments.

In summary, it can be determined that a cant will be necessary in order to suppress the harmonics through slotting to a large extent. This generally takes place through chamfering the slots or the pole system (with permanent magnetic excitation by means of chamfering the lateral magnetic edges). However the anchors or stators having chamfered slots can no longer receive windings in direct current motors, brushless direct current motors and synchronous motors for rotary current drive systems and components including permanent excitation. The magnet will thus have to be chamfered.

However, chamfered magnets cannot be ground in the through-feed by means of loosely stringing them together, as the lateral axial guidance as well as the support is no longer provided due to the cup's canted and twisted shape. Grinding is indispensable due to the sinter distortion. So far, these chamfered cups could only be ground in fixed clamped supports, i.e. in support devices, which were created especially for this purpose and for each face, which had to be treated, and they must be ground in separate process steps.

On the one hand, the helix angle effect can now be fully reached and the occurrence of reluctance moments can be effectively avoided by means of the magnet's shape in accordance with the invention. On the other hand, stable support and docking points are created, which enable grinding in the through-feed without the need for additional support devices.

What is claimed is:

1. A cup-shaped magnet for electric motors having two front surfaces, two lateral surfaces and two curving top surfaces; said curves of the top surfaces extending from one front surface to the other and said lateral surfaces being chamfered in a v-shape in a tangential direction.

2. The cup-shaped magnet of claim 1, wherein the lateral surfaces are chamfered in such manner that the full cant is reached in the center of the axial length.

3. The cup-shaped magnet of claim 1 wherein the front surfaces are lying congruently in an axial direction.

4. The cup-shaped magnet of claim 1 wherein oxide compounds of rare earth elements or hard ferrites or AlNiCo materials are provided as magnet material.

5. The cup-shaped magnet of claim 1 wherein the magnet is produced in a sinter process.

6. The cup-shaped magnet of claim 1 wherein several partial magnets are axially staggered, whereby of an amount n of partial magnets, the partial magnets' helix angle only accounts for the $n^{th}$ part of the total cant, and the partial magnets are tangentially offset successively by this part.

7. The cup-shaped magnet of claim 1 wherein an even number of partial magnets are axially staggered, whereby the cant of a partial magnet only amounts to half of the total cant, and the partial magnets are alternatively strung together.

8. The cup-shaped magnet of claim 1 wherein said v-shaped chamfers of the lateral surfaces extend in the same direction.

* * * * *